(12) United States Patent
Egberts

(10) Patent No.: US 6,549,844 B1
(45) Date of Patent: Apr. 15, 2003

(54) METHOD FOR NAVIGATING A VEHICLE

(75) Inventor: Egbert Egberts, Eindhover (NL)

(73) Assignee: Siemens AG (DE)

( * ) Notice: Subject to any disclaimer, the term of this patent is extended or adjusted under 35 U.S.C. 154(b) by 25 days.

(21) Appl. No.: 09/650,544

(22) Filed: Aug. 30, 2000

(30) Foreign Application Priority Data

Sep. 21, 1999 (DE) ........................................ 199 45 124

(51) Int. Cl.[7] ................................................. G06F 7/00
(52) U.S. Cl. ........................ 701/205; 701/214; 701/217
(58) Field of Search ................................. 701/200, 201, 701/207–209, 210, 205, 213, 214, 217, 300; 342/357.02, 357.08, 357.12, 357.13

(56) References Cited

U.S. PATENT DOCUMENTS 5,374,933 A * 12/1994 Kao ...................... 342/357.13
5,394,333 A * 2/1995 Kao ............................ 701/217
5,745,868 A * 4/1998 Geier .......................... 701/216

* cited by examiner

*Primary Examiner*—William A. Cuchlinski, Jr.
*Assistant Examiner*—Edward Pipala
(74) *Attorney, Agent, or Firm*—Mayer Brown Rowe & Maw

(57) ABSTRACT

The invention specifies a method for navigating a vehicle, in which an actual position of the vehicle is ascertained using the length and direction of distances covered, a control position is ascertained at intervals of time using external auxiliary means, and the actual position is reset to the control position if the gap between the actual position and the control position exceeds an error value.

The aim of this is to improve position determination.

To this end, the error value is changed on the basis of a reliability check.

21 Claims, 1 Drawing Sheet

METHOD FOR NAVIGATING A VEHICLE

The invention relates to a method for navigating a vehicle, in which an actual position of the vehicle is ascertained using the length and direction of distances covered, a control position is ascertained at intervals of time using external auxiliary means, and the actual position is reset to the control position if the gap between the actual position and the control position exceeds an error value.

Such a method is used in a "Carin" navigation system, for example.

In the context of vehicle navigation, a distinction is drawn between three subtasks, namely, first position determination, second, route planning, and third, transmitting the route to the driver. The present invention relates to the first part, namely determining the position of the vehicle. It also extends to route planning and to transmission of the route found to the driver.

To determine the position of a vehicle, navigation satellites forming part of a global positioning system or GPS have been available for some time. These satellites radiate a signal. The transit time of this signal can be used to determine the distance from each individual satellite. If the distance from at least three satellites is known, then it is possible to ascertain the position on the earth. However, GPS position determination is generally subject to an error in the order of magnitude of 50 to 100 m. This error can be tolerated while driving on an inter-urban journey. It poses problems, however, when the distance between roads is less than this tolerance threshold, for example in towns or at traffic junctions.

Another type of navigation involves adding the distances covered with their directions on a vector basis, starting from a starting point. This procedure is also called compound navigation or "dead reckoning". Such navigation also produces errors which, by way of example, are based on the fact that the distance covered in one direction and the direction itself cannot be determined with sufficient accuracy. If, by way of example, the distance is ascertained with an error of 1%, then, after a distance of 10 km, the errors which also arise for GPS navigation are again produced in the order of magnitude of 100 m.

Hence, in the case of the "Carin" system mentioned in the introduction, the two navigation methods have been coupled. In principle, the actual position of the vehicle is ascertained using compound navigation, i.e. using sensors which are attached to the vehicle and ascertain the direction in which the vehicle is moving and the distance covered in this direction. From time to time, however, the calculated actual position is checked using external auxiliary means, for example the GPS satellites. If the two positions match, then the actual position continues to be regarded as reliable. If the gap between the actual position and the control position exceeds a predetermined fixed error value, then the control position is used as the new starting point for further navigation.

The invention is based on the object of improving position determination.

This object is achieved for a method of the type mentioned in the introduction by virtue of the error value being changed on the basis of a reliability check.

Thus, a fixed error value is no longer prescribed as previously, for example a gap of 250 m, with the actual position being reset to the control position if said gap is exceeded, but instead this error value or gap is designed to be variable. This can mean that the gap becomes greater than previously under certain circumstances. In this case, a correction is made less frequently or later. However, it can also mean that the error value becomes smaller than previously, so that corrections need to be made more frequently or earlier. The reliability can also incorporate the "past", for example. If it has been found in the past that the actual positions ascertained using compound navigation are reliable, then the actual positions can be trusted more and a correction can be made less often.

It is also advantageous if the reliability is determined using at least one comparison position. The comparison positions can be used to estimate whether the actual positions have been ascertained correctly.

In this case, it is preferable for the comparison position to be determined using external auxiliary means. The external auxiliary means are independent of the calculation of the position using compound navigation. This produces an objective criterion which contributes to improved assessment of the reliability, even if the comparison position is likewise erroneous.

In this case, a relatively high degree of reliability is assumed if the profile of the actual positions matches the profile of the comparison positions, or the gap between the actual positions and the comparison positions is small over a plurality of determination operations. In this case, small means a range of below 100 m, for example. Thus, if the actual positions follow the profile of the comparison positions, then it can be assumed that compound navigation has worked reliably and the result is correct. In this case, it is possible to permit a greater error or gap before returning to the control position.

In this context, a particular preference is that a larger error value is assumed for a high degree of reliability than for a low degree of reliability. If, on the other hand, the degree of reliability was lower in the past, then a smaller error value will be used in order to be able to make a correction early on.

Preferably, the reliability value is changed whenever a comparison position has been determined, so long as the reliability value is situated within a predetermined value range. If, for example, it has been found that the actual position and the comparison position have been situated close enough together, then the reliability value can be enlarged, for example by a fixed increment. The reliability value used can be a distance value which may possibly also match the error value. The next time the comparison position is determined, the control position and the actual position could already be situated somewhat further apart without this necessarily resulting in a correction. So long as the gap between the actual position and the comparison position is smaller than the reliability value, the result of this is that the reliability value is enlarged again. If, on the other hand, it is found that the gap is larger than the enlarged reliability value, then this again results in the reliability value being reduced. Accordingly, this also applies to other criteria used to determine the reliability, for example the match between the profiles. However, the reliability value will neither be allowed to become infinitely large nor will it be set to negative numbers. It will always be left in the range from 0 to 50,000 cm, for example. Thus, if the reliability value has reached the upper limit, the reliability value will not be enlarged after the comparison position has been determined.

Preferably, the reliability values are subdivided into classes, and each class is assigned a predetermined error value. The result of this is a restriction to a predetermined number of error values, that is to say, for example, gaps staggered at 60 m, 120 m, 180 m, 240 m and 300 m. It is thus not necessary to convert the reliability value to an error value, but rather it can be found in a table. This simplifies management.

Preferably, the distance covered between two positions is used to change the reliability value. This is an alternative embodiment to the possibility of enlarging the reliability value by fixed increments. The advantage of this procedure is that the distance covered has an influence on the reliability check. If, after a relatively long distance covered, there is still a sufficient match between the actual position and the comparison position, then the reliability value can be increased to a greater extent than if the match exists only after a short distance. The size of the distance covered depends on the frequency at which the comparison positions are determined. The aim is to determine the comparison position at a frequency of 5 Hz. Depending on the speed, the vehicle covers between approximately 1 and approximately 10 m in this case.

Preferably, the external auxiliary means used are satellites. The satellites are available virtually everywhere. They are independent of the vehicle and can therefore be used relatively objectively to determine the comparison position.

As an alternative or in addition to this, the external auxiliary means used can be roads on which the vehicle is depicted. These are virtual roads but largely correspond to the actual roads. In this case, it is assumed that a vehicle will, with a high degree of probability, be moving on a road if such a road is close by. If, therefore, compound navigation has been used to calculate a position which is not all that far away from a position on a road, then the road position can be used as the comparison position. Depiction on the road is also called map matching.

The roads are preferably stored in a database. Thus, depiction on the road is purely numerical.

Preferably, the reliability value is reduced if valid depiction of the vehicle on a road is not possible. Thus, an additional attempt to depict the vehicle on the road, that is to say to perform map matching, is made each time a control position is determined, or more frequently. So long as this is possible, the system assumes that the vehicle is situated on the road. If the system does not find any corresponding road close by on which the vehicle can be depicted, then it changes from an "on road" mode to an "off road" mode. This change is an indication that position determination is becoming less well defined or more inaccurate. The reliability is somewhat reduced.

A further preferred refinement is that the reliability value is reduced if the gap between successive comparison positions is situated outside of a range whose limits are determined by predetermined multiples of the gap between the corresponding actual positions. If the gap between the actual positions is, for example, 0.5 to 2 times the gap between the comparison positions, it is assumed that position determination using compound navigation has been carried out with the required degree of reliability. If the gap between the actual positions is situated outside of this range, that is to say it is smaller than 0.5 times or larger than 2 times the gap between the comparison positions in this case, then it is assumed that an error has occurred and the reliability value is reduced, that is to say the monitoring is intensified.

It is also advantageous if the control positions are filtered. Abrupt changes when control positions are ascertained then have less of an influence on determination of the control positions.

The invention is described in more detail below in conjunction with the drawing, in which.

Figure 1:
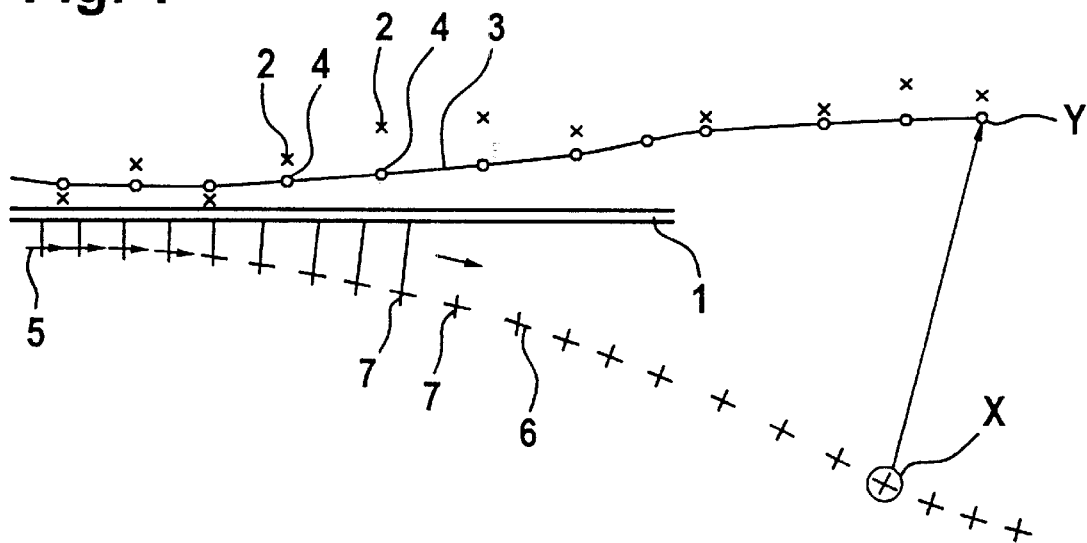
FIG. 1 shows a basic sketch to illustrate the method.

FIG. 1 is a schematic illustration of a situation arising when a vehicle, for example a car or a lorry, is on an inter-urban journey. The vehicle (not shown in more detail) is actually traveling on a road 1. The coordinates of this road are stored in a database which, by way of example, is stored on a CD-ROM and can be read into a navigation system (not shown in more detail).

The navigation system ascertains, as often as possible, that is to say usually at a frequency of 1 Hz, positions 2 using navigation satellites which are part of the global position system or GPS. The sequence of the positions 2 is filtered. This produces a profile 3 of positions 4, called control positions 4 below.

The vehicle's navigation system has a direction meter, for example a gyroscope, and a distance meter. The system uses these to ascertain a series of vectors 5, which are added vectorially. This produces a profile 6 of actual positions 7. Although the actual positions 7 may not indicate the actual location of the vehicle, the navigation system assumes that the vehicle is situated at the actual positions.

The navigation system now compares the actual positions 7 with the profile of the road 1. So long as the actual positions are situated close enough to the road and the direction of the road 1 matches the direction of the profile 6, the system assumes that the vehicle is traveling on the road 1. In other words, the vehicle is depicted on the road (or, in more general terms, the map) or, in other words, is subjected to a map matching operation. The positions on the road 1 can subsequently be used as comparison positions.

However, as previously, the actual positions 7 following the profile 6 are used for calculation.

FIG. 1 shows that erroneous calculation or erroneous ascertainment of the individual values used for calculation can result in a profile 6 of the actual values which is significantly different to both the road 1 and the profile 3 of the control positions 4.

So that the position of the vehicle, ascertained using compound navigation, is not completely misleading, the actual position 7 is then compared at intervals with the control position 4. Since the control position 4 is filtered with respect to the actual GPS position, inaccuracies when the position is ascertained using the satellites are compensated for to some extent over time.

The gap between the actual position 7 and the associated comparison position on the road 1 is then ascertained from time to time, for example at a frequency of 5 Hz. At the beginning of the journey, a reliability value was prescribed, for example 25,000 cm or 250 m. If the profile 6 of the actual positions 7 then matches the profile of the road 1, the system then assumes that the position determination using compound navigation is correct. The reliability value is then increased, that is to say enlarged, and can be enlarged in various ways. The match can be established, for example, if the direction of the road 1 and of the profile 6 differ by no more than a predetermined value and the gap between successive actual positions 3 is, by way of example, 0.5 to 2 times the gap between the corresponding comparison positions.

One option is to use a fixed increment for enlargement, for example 10 m.

Another option is to use the distance covered between the current actual position 7 and the actual position 7 situated before this in order to enlarge the reliability value.

The reliability value can, as mentioned, change in a range from 0 to 50,000 cm or from 0 to 500 m. However, an error value or gap of neither 0 m nor 500 m is desirable. Accordingly, the reliability value would need to be converted to an error value on the basis of some prescribed function. Alternatively, the reliability values can be subdivided into individual classes and, by way of example, the error value 60 m can be assigned to a reliability value of 0 to 100 m, and the error value 120 m can be assigned to a reliability value of greater than 100 m to 200 m, until finally an error value of 300 m is permitted for a reliability value of 500 m. These figures apply to the illustrative embodiment described, which works well on "normal" terrain, that is to say plains or low mountain ranges. Under some circumstances, other numerical values apply for navigation in the mountains or in a town with multistory buildings.

In FIG. 1, it can be seen that, despite an increasing gap between the profile of the filtered control positions 4 and the profile 6 of the actual positions 7, there is still no correction taking place. This is because it is assumed that ascertaining the actual positions using compound navigation or "dead reckoning" is reliable enough. If this ascertainment has been correct in the past, then greater discrepancies from the control positions are permissible. Only at a point X is the gap so large that the error value calculated for this reliability value is exceeded. At this point, the actual position is reset to the filtered control position and compound navigation continues to operate using this control position Y for further calculation.

In this context, the error value cannot become infinitely large. By way of example, it can be restricted to 30,000 cm or 300 m. The lower limit can also be selected to be not equal to 0, for example to be 60 m.

If the actual position 7 has been reset to the control position 4, then the reliability value can be set to its starting value again.

Figure 2:
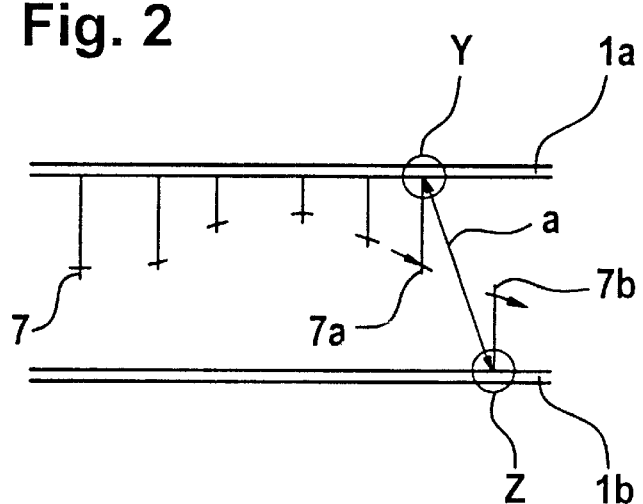
FIG. 2 shows a sketch to illustrate the reduction in the degree of reliability.

FIG. 2 now shows a situation in which the reliability value is reduced. It shows the situation where two roads run parallel to one another at a relatively short distance. Such a situation can be found in towns, for example. Compound navigation is now used to calculate actual positions 7 situated between these two roads. The map matcher first depicts the positions 7 on the top road 1a, because this is the closest road. However, this depiction works only up to an instant Y. At an instant Z, the map matcher decides that road 1b is the correct one. Accordingly, the gap between the positions, used as comparison positions in this case, on the roads 1a and 1b is relatively large. It more than twice exceeds the gap between the two corresponding actual positions 7a, 7b. Accordingly, the reliability value is reduced by the gap a.

Figure 3:
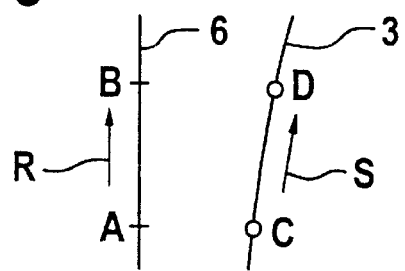
FIG. 3 shows an illustration to explain further checking criteria.

Further criteria for when the reliability value is enlarged or reduced can also be established. This will be explained with the aid of FIG. 3.

The figure shows two actual positions A, B and two comparison positions C, D, and also the direction R of the profile 6 of the actual positions and the direction S of the profile 3 of the comparison positions 4.

The gap A, B must be 0.5 to 2 times the gap C, D; the reliability value can then increase. If it is outside this range, it is assumed that an error has occurred. The reliability value is reduced accordingly, because the reliability has fallen. The directions R and S can also be compared with one another. If a discrepancy exceeding a predetermined measure has arisen here, then the reliability value is likewise reduced, because the map matcher decides that the vehicle is no longer traveling on the road, that is to say changes over from "on map" to "off map". While "off map", the reliability value falls so long as it is greater than zero. When "on map", the reliability value can increase or decrease on the basis of the criteria illustrated above.

Finally, the distances A, D or B, C can also be compared with threshold values. If gaps which are too large arise in this case, the reliability value can likewise be reduced.

What is claimed is:

1. A method for navigating a vehicle, in which an actual position of the vehicle is ascertained using the length and direction of distances covered, a control position is ascertained at intervals of time using external auxiliary means, and the actual position is reset to the control position if the gap between the actual position and the control position exceeds an error value, wherein the error value is changed on the basis of a reliability check.

2. The method as claimed in claim 1, wherein a larger error value is assumed for a high reliability value than for a low reliability value.

3. The method as claimed in claim 2, wherein the reliability value is determined using at least one comparison position.

4. The method as claimed in claim 3, wherein the comparison position is determined using external auxiliary means.

5. The method as claimed in claim 3, wherein a relatively high reliability value is assumed if a profile of the actual positions matches a profile of the comparison positions or the gap between the actual positions and the comparison positions is small over a plurality of determination operations.

6. The method as claimed in claim 3, wherein the reliability value is changed whenever the at least one comparison position has been determined, so long as the reliability value is situated within a predetermined value range.

7. The method as claimed in claim 6, wherein the reliability values are subdivided into classes, and each class is assigned a predetermined error value.

8. The method as claimed in one of claims 3, 6 or 7, wherein a distance covered between two positions is used to change the reliability value.

9. The method as claimed in claim 1, wherein the external auxiliary means used are satellites.

10. The method as claimed in claim 1, wherein the external auxiliary means used are roads on which the vehicle is depicted.

11. The method as claimed in claim 10, wherein the roads are stored in a database.

12. The method as claimed in claim 11, wherein
   a larger error value is assumed for a high reliability value than for a low reliability value, and
   the reliability value is reduced if valid depiction of the vehicle on a road is not possible.

13. The method as claimed in claim 3, wherein the reliability value is reduced if the gap between successive comparison positions is situated outside of a range whose limits are determined by predetermined multiples of the gap between the corresponding actual positions.

14. The method as claimed in claim 1, wherein the control positions are filtered.

15. The method as claimed in claim 5, wherein the reliability value is changed whenever a comparison position has been determined, so long as the reliability value is situated within a predetermined value range.

16. The method as claimed in claim 15, wherein the reliability value is reduced if the gap between successive comparison positions is situated outside of a range whose limits are determined by predetermined multiples of the gap between the corresponding actual positions.

17. The method as claimed in claim 16, wherein a distance covered between two positions is used to change the reliability value.

18. The method as claimed in claim 17, wherein the reliability values are subdivided into classes, and each class is assigned a predetermined error value.

19. The method as claimed in claim 18, wherein the comparison position is determined using the external auxiliary means, wherein the external auxiliary means used are satellites or roads on which the vehicle is depicted.

20. The method as claimed in claim 19, wherein the reliability value is reduced if the external auxiliary means used are roads on which the vehicle is depicted and valid depiction of the vehicle on a road is not possible.

21. The method as claimed in claim 20, wherein the control positions are filtered.

* * * * *